(12) United States Patent
Betteridge et al.

(10) Patent No.: US 10,907,930 B2
(45) Date of Patent: Feb. 2, 2021

(54) IMPACT ABSORBING PADDING SYSTEM WITH ELASTOMERIC SUB-SURFACE STRUCTURE

(71) Applicants: Bryce L. Betteridge, University Place, WA (US); Robert Samuel Bishop, Chehalis, WA (US)

(72) Inventors: Bryce L. Betteridge, University Place, WA (US); Robert Samuel Bishop, Chehalis, WA (US)

( * ) Notice: Subject to any disclaimer, the term of this patent is extended or adjusted under 35 U.S.C. 154(b) by 0 days.

(21) Appl. No.: 15/644,683

(22) Filed: Jul. 7, 2017

(65) Prior Publication Data

US 2018/0017354 A1 Jan. 18, 2018

Related U.S. Application Data

(60) Provisional application No. 62/360,243, filed on Jul. 8, 2016.

(51) Int. Cl.
| | | |
|---|---|---|
| *F16F 1/376* | (2006.01) | |
| *F41C 23/08* | (2006.01) | |
| *F16F 1/44* | (2006.01) | |
| *A42B 3/12* | (2006.01) | |
| *A63B 71/10* | (2006.01) | |
| *A63B 71/12* | (2006.01) | |
| *A63B 71/14* | (2006.01) | |

(52) U.S. Cl.
CPC .............. *F41C 23/08* (2013.01); *F16F 1/376* (2013.01); *F16F 1/44* (2013.01); *A42B 3/124* (2013.01); *A63B 71/10* (2013.01); *A63B 71/1225* (2013.01); *A63B 71/141* (2013.01); *A63B 2071/125* (2013.01); *F16F 2224/025* (2013.01)

(58) Field of Classification Search
CPC ..... F41C 23/08; A47C 27/144; A47C 27/146; A47C 7/18; F16F 1/36; F16F 1/376; F16F 1/3615; F16F 1/3737; A41D 13/0156; A43B 13/181
USPC ............................................... 267/145; 42/74
See application file for complete search history.

(56) References Cited

U.S. PATENT DOCUMENTS

| | | | | |
|---|---|---|---|---|
| 488,855 | A * | 12/1892 | Townsend | ............... F41C 23/08 42/74 |
| 1,842,527 | A * | 1/1932 | Knight | ................... F41C 23/08 42/74 |
| 3,147,562 | A * | 9/1964 | Pachmayr | ............... F41C 23/08 42/74 |
| 3,298,046 | A * | 1/1967 | Clementi | ................. A47C 7/18 297/452.48 |

(Continued)

*Primary Examiner* — Bradley T King
*Assistant Examiner* — Stephen M Bowes
(74) *Attorney, Agent, or Firm* — Patrick M Dwyer

(57) ABSTRACT

A cushioning and impact absorbing pad system with a surface layer of thickness t, and an elastomeric sub-surface structure of height h. The sub-surface structure comprises an array of elastomeric columns wherein each column has a frustoconical column wall surrounding a central void. The frustoconical column walls have a zone that is a more compressible, relatively collapsible zone in a region at an end of the column opposite the surface layer and a zone that is a relatively less compressible zone in a region at the end of the column abutting the surface layer. In other embodiments, pad thickness and column height are variable to create a surface which follows the contours of a human body.

7 Claims, 4 Drawing Sheets

(56) References Cited

U.S. PATENT DOCUMENTS

| | | | | |
|---|---|---|---|---|
| 3,720,966 A | * | 3/1973 | Zysman | A47C 7/20 |
| | | | | 297/DIG. 2 |
| 3,852,904 A | * | 12/1974 | Drevet | F41C 23/08 |
| | | | | 42/71.01 |
| 4,948,116 A | * | 8/1990 | Vaux | A63C 19/04 |
| | | | | 472/92 |
| 5,234,738 A | * | 8/1993 | Wolf | E01C 5/18 |
| | | | | 404/32 |
| 2003/0186025 A1 | * | 10/2003 | Scott | B32B 7/02 |
| | | | | 428/119 |

\* cited by examiner

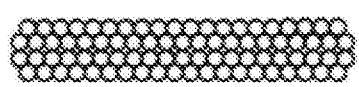
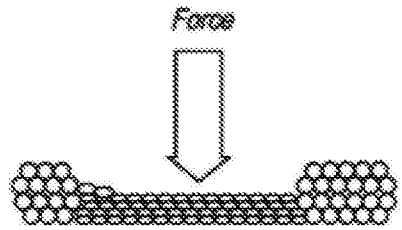
Figure 1A
[Prior Art]
Figure 1B
[Prior Art]
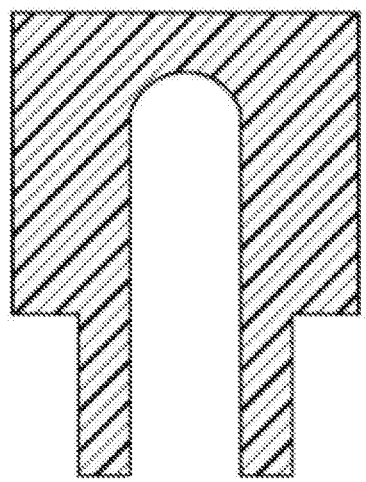
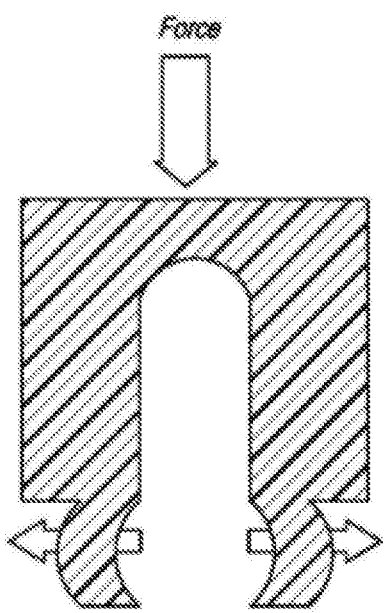
Figure 2A
Figure 2B

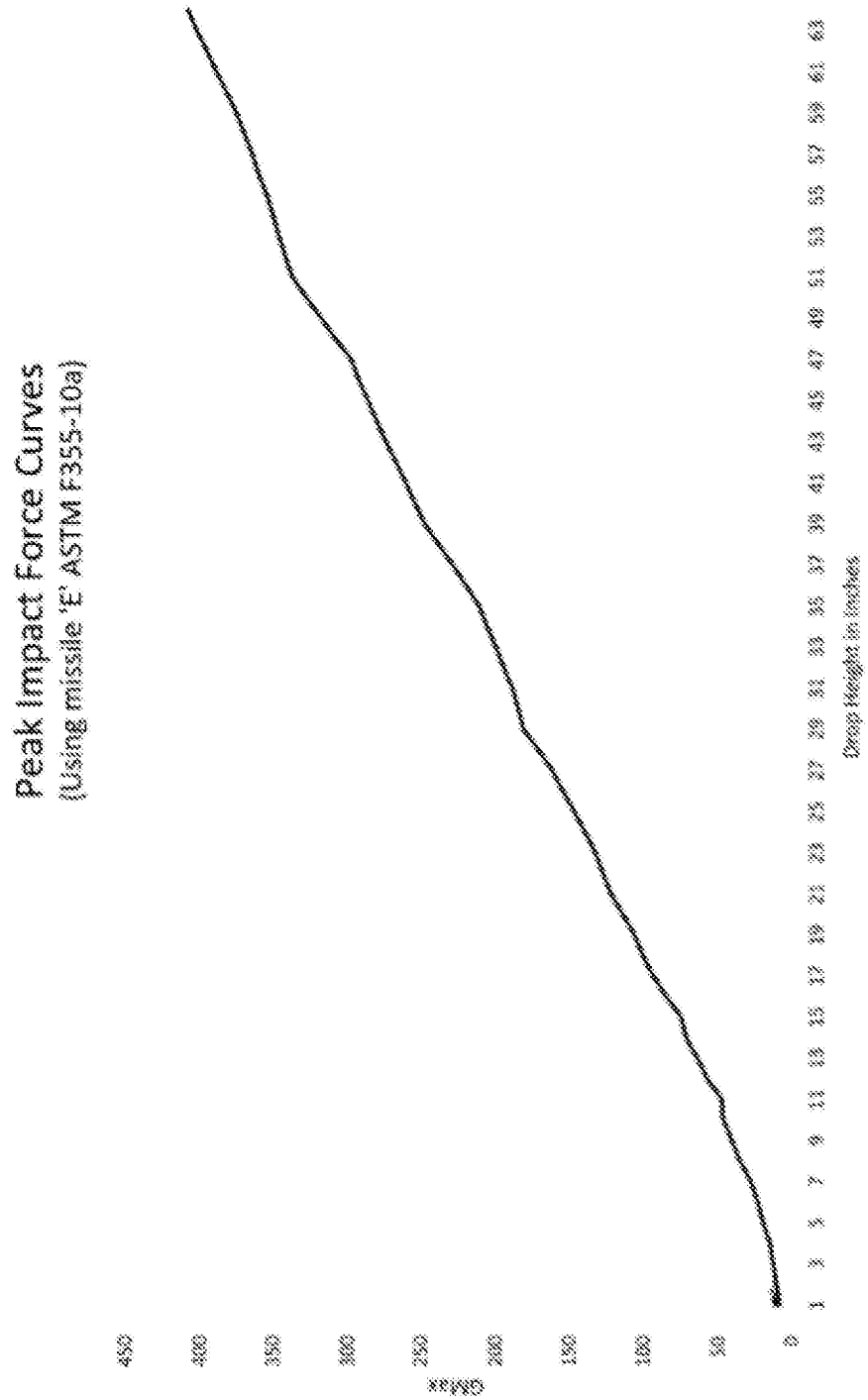

IMPACT ABSORBING PADDING SYSTEM WITH ELASTOMERIC SUB-SURFACE STRUCTURE

This application claims priority to U.S. Provisional Patent Application 62/360,243 filed Jul. 7, 2016 and is hereby incorporated as if fully set forth herein.

TECHNICAL FIELD

The invention relates to systems for attenuating applied force and absorbing impact energy; more particularly, it relates to elastomeric subsurface structures and deformable structures for attenuating applied force and absorbing impact energy; more particularly it relates to structures and deformable structures for attenuating applied force and absorbing impact energy in sporting goods such as gun stock pads.

BACKGROUND OF THE INVENTION

Conventionally, some kind of system is used to attenuate recoil impact in a shoulder held firearm. Many such systems are known. Some use closed-cell foam or vulcanized rubber chips bound together to provide a shock absorbing structure. The problems with most conventional gun pad structures and the like is twofold. Foam and most other conventional impact attenuating structures actually get harder as the force applied to them increases, and they can bottom out. In most conventional systems, the force absorbing mechanism begins with an immediate displacement at the very surface of the pad.

Dense forms of rubber do not provide bottoming-out protection and are relatively incompressible providing little attenuation of recoil impact.

Recently our own patented advances in the field of force attenuation have lead to a breakthrough in many if not all of the above noted problem aspects. In the realm of materials comprised of deformable cells ranging in height from 25 to 75 mm or so, our patented technology does an excellent job. However, as a need for ever smaller cells in thinner materials became apparent, it became evident to us, that our previous formulations in cell shapes, dimensions, and height ratios of more compressible to less compressible regions would not result in impact absorbing materials that could perform at comparable levels with our previous innovations. This has been especially noted in materials intended for use as recoil padding for firearms.

Conventional padding for use next to or attached to the body has technology similar to that discussed above. It is common to use closed-cell foam, gel or liquid, some rigid or more compressible depending on the application. All of these systems exhibit the difficulties of any padding system, many of which have been discussed above.

There is a need for effective padding that molds and shapes to the contours of the human body. Such impact attenuating padding may be attached to sporting equipment such as the butt end of a rifle or the inside of a helmet, or worn attached to the human body, for example, in knee, elbow or shoulder pads, or in gloves.

DISCLOSURE OF THE INVENTION

An impact attenuating pad for installation on the abutting end of a firearm is disclosed. The pad has a base side which is attached against the stock of the firearm and a user side meant to rest against the user's body. For the purposes of this disclosure, we will refer to the base side as the base and the user side as the top of the pad. As seen from the top, the pad is roughly ovoid in shape, with curving side walls that taper into a curved end wall at each end.

Optimally, as seen from the side, the pad tapers in thickness from one end to the other. Advantageously the pad tapers from a total thickness in the ranges of 0.8-1 inch (thickness shown is 006 inch) at one end to 1.1-1.5 inches at the other end (thickness shown is 1.295 inch).

Enclosed within the pad are a series of frustoconeal shaped cylinders or columns, each enclosing a void. Each frustoconical cylinder's central axis rises perpendicular to the base of the pad. The tops of the cylinders are domed with the domed tops of the cylinders resting in a surface layer constituting the user side of the pad.

Optimally the cylinder walls are tapered, both inside and out, such that a cross-section of each cylinder wall is narrower at the base and wider at the top of the cylinder. At a certain point the inner wall of the cylinder ceases to be linear and curves into the domed top of the cylinder. The walls of the cylinders are narrower and more compressible at the base and wider and less compressible as they approach the point where the inner wall curves into the dome.

The outside draft angle of the cylinder walls is the angle formed by the central axis of the frustoconical-shaped cylinder and a line extended along the tapered outside wall of the cylinder within a vertical cross-section of the cylinder. Preferably this angle is greater than five degrees and less than eleven degrees. (Angle shown is 10 degrees.) Similarly, the Inside draft angle of the cylinder is the angle formed by the central axis of the cylinder and a line extended along the tapered inside wall of the cylinder within a vertical cross-section of the cylinder. Preferably this angle is greater than two degrees and less than five degrees (Angle shown is 4 degrees.).

In one contemplated embodiment, the series of frustoconical shaped cylinders increase in height from one end of the pad to the other. In this embodiment, the circumferences of the bases of the cylinders remain constant. At a certain point, the inner walls of the cylinder cease to be linear and begin to be curved (curving into the domed top of the cylinder). A cross-sectional slice taken at this point will become smaller with each incremental increase in height because of the frustoconical shape of the cylinders.

In a specific version of this embodiment, the series of domed frustoconical cylinders are graduated in height. If each cylinder in the series is numbered from 1 to n, the height h of each cylinder within the series increases approximately according to the equation:

$$h = 0.0116n^2 - 0.0362n + 0.53 [+ \text{ or } - \text{ up to } 0.04]$$

This causes the radius r of the circular cross-section of the cylinder taken at the point where the inner walls cease to be linear to become narrower approximately according to the equation:

$$r = -0.0004n^2 + 0.0014n + 0.20 [+ \text{ or } - \text{ up to } 0.02]$$

And the thickness of the cylinder wall $T_w$ taken at the point where the inner walls cease to be linear to become wider approximately according to the equation:

$$T_w = 0.0013n^2 - 0.0037n + 0.13 [+ \text{ or } - \text{ up to } 0.02]$$

An embodiment of a resilient padding system is disclosed for use where the pad must conform to a relatively non-planar shape. This resilient padding system also includes a substructure of a plurality of supporting resilient substructure hollow columns, each column having a column wall forming the column, and a first end and an enclosed second end. The column wall surrounds a central void, the void extending from the first end to the enclosed second end of the column. The column wall also has a cross-sectional thickness that is thinner at the first end of the wall than at the enclosed second end of the wall. The part of the wall that abuts the first end of the column is a more collapsible zone where the cross-section of the column wall is thinner, relative to a less collapsible zone in a region abutting the second end of the wall where the cross-section is thicker.

In one embodiment at least one of the surfaces of the pad is contoured to form a non-planar surface. The pad system has a cross-sectional pad thickness T that varies over the expanse of the pad and each central void defined by the column walls has a height h at the column central axis within the cross-sectional thickness T, such that h varies over the expanse of the pad. In addition, a surface layer with cross-sectional thickness t extends beyond the enclosed end of each central void within the cross-sectional pad thickness T, such that T=t+h where the central void meets t at the central axis of each column. In this embodiment, the ratio of h:t may be variable and the ratio may fall within the range of greater than 4.0 and less than 6.0.

In some embodiments the column wall tapers, forming a frustoconically shaped column. A column wall will have an inside surface and an outside surface, and therefore in some embodiments the column wall is tapered both inside and out, and has draft angles for both the Inside surface and the outside surface of the wall. As the wall tapers, the cross-sectional thickness of the column wall may increase from the first end of the column wall to the enclosed end of the column wall by a percentage within a range of greater than 184% and less than 231%.

Advantageously, in some embodiments the column wall increases in thickness to meet and form a dome at the enclosed end.

In one embodiment, for example, an embodiment suitable for a pad on the end of a rifle butt, the height of each column may increase from one end of the pad to the other, in order to contour to a the part of the body against which the rifle will rest upon firing. In this example, the heights of the columns may vary according to the quadratic function expressed above, where n denotes a numbering of the columns ranging from one side of the pad to the other and the central void height h increases from one side of the pad to the other. Alternatively, the equation $$h=0.0116n^2-0.0362n+0.50[+ \text{ or } - \text{ up to } 0.04]$$

may be applied. It is understood that minor variations in any of the expressed equations and relationships are contemplated as part of this disclosure in order to adapt to specialized sports and body usages of the disclosed pads.

Additional embodiments may advantageously be used in athletic padding which is used for attenuating impact stress in sports and recreation environments. Such padding may be attached to sporting equipment, such as the butt end of a rifle or as pads inside a helmet, or worn attached to the body, for example, in knee, elbow or shoulder pads, or in gloves. Thus the same technology may be formulated with varying cell shapes, dimensions and height ratios to contour to a relatively non-planar shape provides impact attenuation between the human body and sporting equipment, or if attached to the human body as padding at critical areas.

BRIEF DESCRIPTION OF THE DRAWINGS

FIGS. 1A and 1B are schematics of conventional closed cell foam cushion at rest and under load, respectively.

FIGS. 2A and 2B are pictures of disclosed embodiments of elastomeric structure, at rest and under load, respectively.

FIG. 6 is a graph of peak impact force vs drop height for selected embodiments.

DETAILED DESCRIPTION

Figure 3:
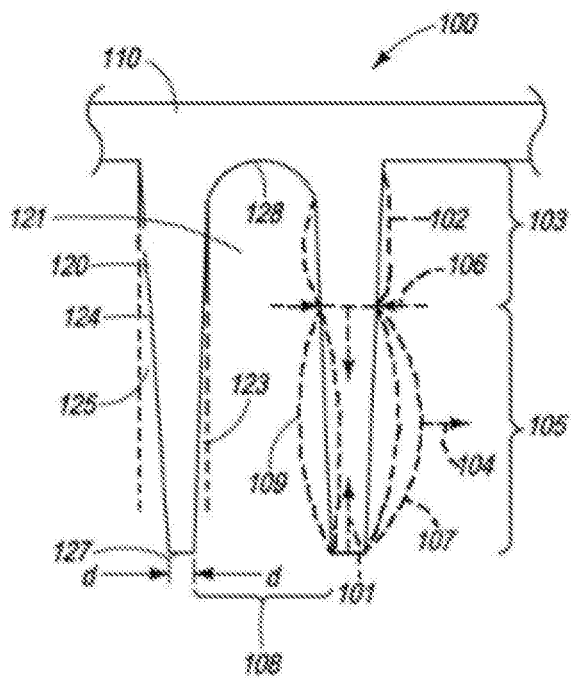
FIG. 3 is a sectional elevation of an aspect of the disclosed pad with certain elements exaggerated for clarity.

Turning now to the drawings, the invention will be described in a preferred embodiment by reference to the numerals of the drawing figures wherein like numbers indicate like parts.

Multiple views of one embodiment of the disclosed gun pad are shown, including cross-section and other detailed views. Domed internal elastomeric cylinders with tapered walls are shown along with a top or shoulder-contacting surface.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "In an embodiment" in various places throughout this specification are not necessarily all referring to the same embodiment. Furthermore, the particular features, structures, or characteristics may be combined in any suitable manner in one or more embodiments.

Reference throughout this specification to a "column" refers to a tubular shafted support structure, typically having a cylindrical or polygonal shaft and two shaft ends. Similarly, references throughout this specification to a "cylinder" refers to a tubular shafted support structure, also with two shaft ends.

Reference throughout this specification to a "column end" refers to the set of points at which the column shaft is considered to end. A column end may be open or enclosed. Generally, the columns referenced in this specification have a central axis and the column ends are defined by the ending of the column shaft at a virtual plane of intersection which is approximately perpendicular to the central axis of the column. However, an enclosed column end may be domed, dimpled or of any other shape on the inside surface or the outside surface of the column.

Generally, the columns referenced in this specification are hollow columns, having a central void surrounded by a continuous, curved "column wall" defining the shaft or curved surface of the column. A column wall may be of generally consistent cross-sectional thickness or of variable cross-sectional thickness, for example relatively thicker at one end and thinner at the other end of the column.

The term "conical" is used throughout this specification to reference a shape generally described by the common advanced-geometric definition of a cone. A cone is any three-dimensional shape that is formed by a set of line segments connecting a common point, the apex, to all of a set of points on a base, the base being in a plane that does not contain the apex. Note that the base need not be restricted to a set of points forming a circle; the base may be any shape, formed from any set of points. For example, a cone with a polygonal base forms a pyramid, and a cone with an elliptical base forms an elliptical cone.

Reference throughout this specification to a "frustoconical" shape refers to a conical shape that has the pointed apex truncated, such that the basal part of the cone remains, and the cone extends from the set of points forming the base of the cone to a set of points in a plane, the plane being approximately perpendicular to the central axis of the cone.

Reference throughout this specification to an "outside draft angle" and an "inside draft angle" refers to the following angles. Commonly, the perimeter of the base of a cone is called the directrix, and the line segment between the directrix and apex is a generatrix of the lateral surface. In the case of a hollow column which is conically-shaped with a column wall thickness, there will be two cones, one inside the other to form the column. Both cones approximately share a central axis. One cone's lateral surface forms the outside lateral surface of the column shaft, and one cone's lateral surface forms the inner lateral surface of the column shaft. The outside draft angle is the angle formed between a generatrix of the outside lateral surface and the common central axis. The inside draft angle is the angle formed between a generatrix of the inner lateral surface and the common central axis.

Reference throughout this specification to "bottoming out" refers to a point where a cushioning material or structure reaches a state where relatively little further deformation is possible in the direction of force.

FIGS. 1A and 1B are schematics of a conventional closed cell foam cushion at rest and under load, respectively. In FIG. 1B, the foam cushion shows an unstable condition as the surface deforms under the load, leading to a dangerous potential binding due to the surface deformation. Impact energy is absorbed by crushing the foam cells from top to bottom, and the material gets just gets 'harder' under load.

FIGS. 2A and 2B are pictures of disclosed embodiments of the elastomeric structure, at rest and under load, respectively. Note that as the structure takes impact or load, surface deformation is minimal, there is no tendency to bind, impact energy is absorbed by 'controlled' buckling or collapse of the structure (cylinder is illustrated) at a first zone of the cylindrical structure, not at the enclosed second zone of the cylindrical structure. The material thus gets 'softer' under load, as the collapsible structure continues to deform, and the structure of the pad resists 'bottoming out' as the load is absorbed by the second zone deformation which is relatively more resistant to deformation.

FIG. 3 is a sectional elevation of an embodiment of disclosed pad 100 in which the length of the column or cylinder has been exaggerated for illustrative purposes. Pad 100 has surface layer 110. Surface layer 110 is supported by column 120, comprising a column wall 124 and a central void 121. Column 120 may be any ready and appropriate shape, but regular geometric shapes are preferred, and a cylindrical or frustoconical shape is advantageous in ease of production, and will be discussed here as the model for all such columns. (Except for particular discussion of the draft and other taper angles of column 120 in the frustoconical column model, for ease of reference, the column will at times typically be referred to as a cylinder.) Column wall 124 has a column end 127, which is advantageously a tubular end, with the hollow center opening to void 121 within column 120. Column wall 124 at column end 127 has a width d. In one embodiment the second end of the column is dome shaped and dome 128 forms an enclosed end of void 121.

Column wall 124 has two zones, a first zone 105 that is in the region of the column end 127 and a second zone 103 that is in the region of dome 128. Second zone 103 is relatively resistant to collapse, unlike first zone 105 which is designed not only to take all of the working load compression, but also the initial over load collapse or deformation, and is relatively much more compressible that second zone 103. First zone 105 typical compression is attended by a moderate deformation shown at paired dotted lines 100 as a slight bulge, both outward and inward (relative to the column's central axis), as the compressional forces (illustrated by arrows 101) work to compress the elastomeric material vertically in height and cause the material to bulge away from the wall's resting boundaries. As the load increases, either due to increased load, or due to an impact, first zone 105 actually buckles or collapses in severe deformation in the manner and in the directions indicated by paired dashed lines 107 and arrow 104. The material ceases essentially to compress or bulge further, and instead collapses outwardly (relative to the center axis of the column) in the characteristic buckled collapse shown schematically.

Second zone 103 acts mostly passively throughout both the early and then severe compression and deformation of first zone 105. Depending on forces involved and the dimensions and properties of the rubber and column, second zone 103 will exhibit only slight bulging, schematically represented by paired dotted lines 102. This difference is intentional and while other, as yet not fully appreciated, factors may be at work, it is believed that the pronounced differential in compression effect and eventual buckling collapse (first zone 105 only) is due to a significant difference in the geometry of zone 103 compared to zone 105.

First zone 105 starts out at column end 127 as relatively narrow in cross-section, increasing in thickness until it reaches an increase in wall thickness adequate to accomplish the deformation effect described above. Somewhere about in this region of column wall 124 is a virtual zone boundary 106. At and above this virtual zone boundary the material properties, abetted by increased cross-sectional thickness, simply stop supporting any ready compression or collapse. Above this virtual boundary, compression forces are essentially passed through to the first zone without bulge or other deformation effect inside the second zone, until and unless the second zone collapses completely, as in a most severe impact on surface layer 110 of pad 100. At such time the relatively less compressible second zone 103 nonetheless comes into play to prevent 'bottoming out' by absorbing the extraordinary impact energies remaining after passing them through to first zone 105. Given enough impact force, Zone 105 will, in fact, deform as well, absorbing even more of the Impact energy.

While the schematic illustration of FIG. 3 shows gradual tapering of first zone 105 up into second zone 103, crossing only a virtual boundary 100 between the zones, other embodiments will make the boundary explicit by employing increased thickening upwards in other than gradual or tapered fashion. For instance, and not by way of limitation, second zone 103 could have a sudden thickness change, perhaps even by way of a thickened step at or around boundary 106, so that the increased thickness is suddenly achieved, rather than gradually.

Figure 4:
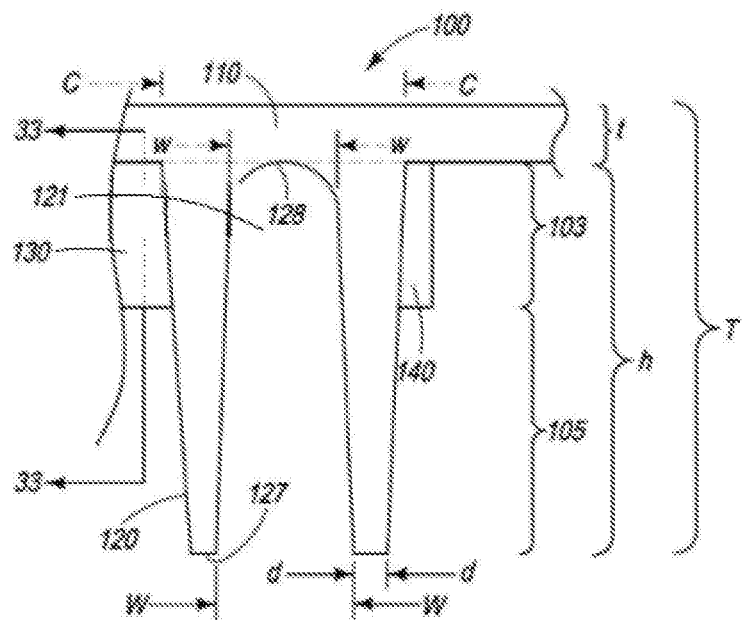
FIG. 4 is a sectional elevation of an aspect of the disclosed pad with certain elements exaggerated for clarity.

FIG. 4 is a sectional elevation of an embodiment of disclosed pad 100 in which the length of the column or cylinder has been exaggerated for illustrative purposes. Column 120 has width C at the enclosed end of the column, just under the upper layer 110. Void 121 has an uppermost width w. Just before any dome 128. In this alternate embodiment, column 120 has a stiffening rib 140 and/or a linkage or bridge 130 connecting to other columns and to the underside of surface layer 110. (See also FIG. 3.) In either case, the effect of the rib 140 or link 130 is to make the relatively less collapsible zone 103I that much stiffer and so enhance the effects (discussed for FIG. 3) for second zone 103. At least one effect is that, to the extent a rib 140 or link 130 is joined to column 120, the column width at that point is significantly and effectively greater than below the rib or link, or elsewhere around the column. The rib or link optionally have a taper which may optionally end in a rounded rib end or a flat end.

Column base 127 has a width d, and void opening 108 has a width W, where, for cylindrical or conical column enclosing a cylindrical or conical void, the area A of the column base is given by the formula:

$$A=(\pi/4)*((W+2d)^2-W^2),$$

Figure 5:
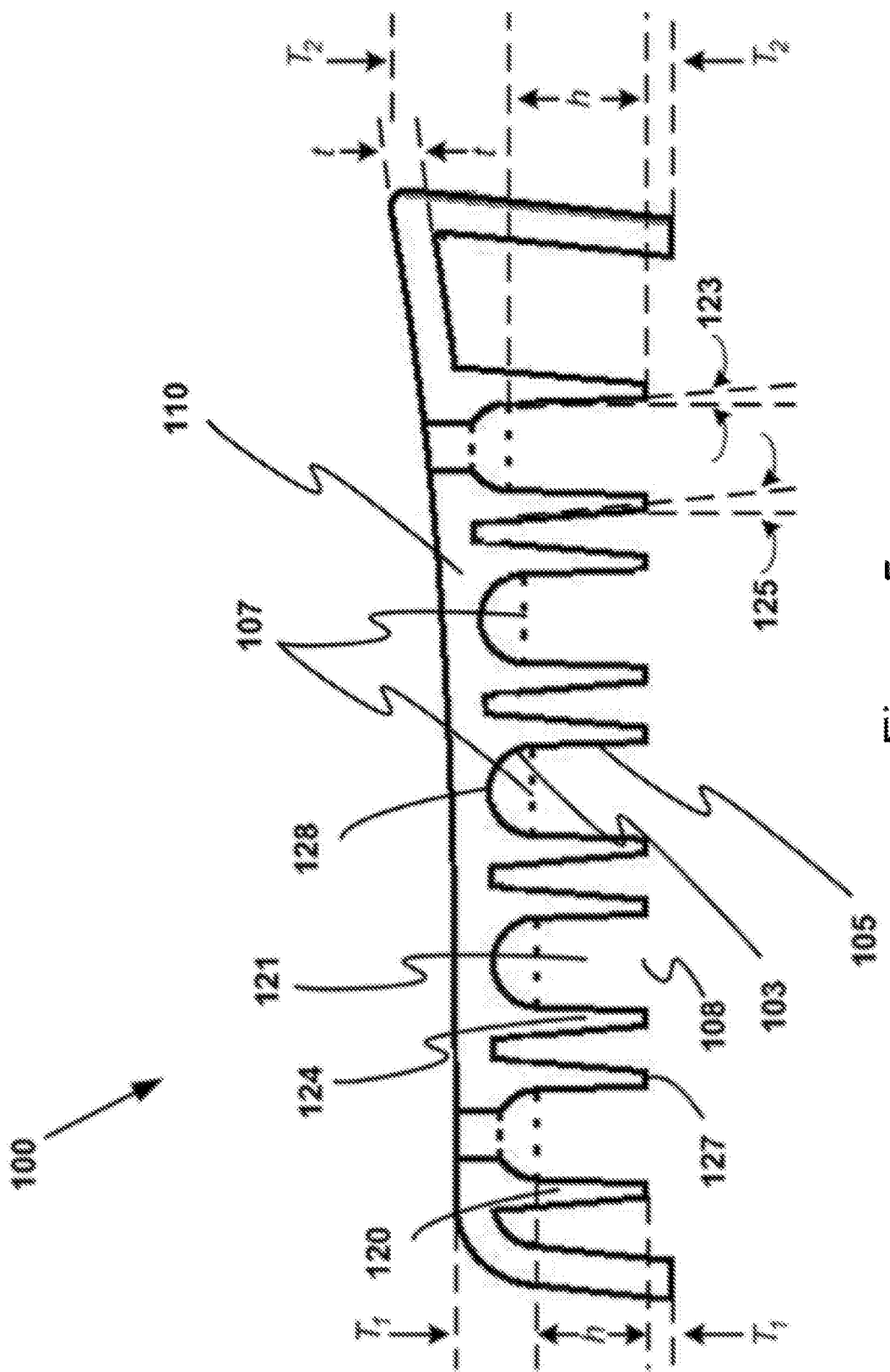
FIG. 5 is a sectional elevation of an embodiment of the disclosed pad.

FIG. 5 is a sectional elevation of an embodiment of disclosed pad 100. This embodiment is a structure of a configuration suitable, for example, for use in various types of athletic and sports padding. For example, and not by way of limitation, the pad described by FIG. 5 serves as a gun pad, or shoulder pad for a rifle butt. This embodiment comprises column 120, central void 121, column wall 124 and column end 127 as discussed above for FIG. 3. The embodiment also comprises a relatively collapsible first zone 105 and a relatively less collapsible second zone 103 of the column wall with all the impact absorbing characteristics discussed above for FIG. 3.

In the embodiment of FIG. 5, column 120 is also of a frusto-conical shape with tapering column wall 124 and optional dome 128, as is discussed above for FIG. 4. The column wall 124 comprises inner and outer column wall draft angles 123 and 125. Preferably, outer draft angle 125 is greater than 5 degrees and less than it degrees and preferably inner draft angle 123 is greater than 2 degrees and less than 5 degrees. For nominal column heights in the range of 0.4 to 0.7 inch, a preferred draft angle will be about 10 degrees for angle 125 and about 4 degrees for angle 123.

In one contemplated embodiment the surface layer 110 of the pad is contoured to fit comfortably against the part of the human body for which it is designed. For example, and not by way of limitation, a pad constructed for installation on the butt end of a rifle might be contoured to fit into the shoulder, with an overall thickness T1 at the left side of the cross-sectional elevation shown in FIG. 5 of about 1 inch (indicated by paired arrows T1 at the left side of pad 100), and an overall thickness T2 at the other end of about 1.3 inches (Indicated by paired arrows T2 at the right side of pad 100).

The elastomeric structure of FIG. 5 also has surface layer 110 with an approximately constant thickness t, as is indicated by paired arrows t, and varying column heights h, as is exemplified by paired arrows h. Advantageously, in order to facilitate the impact attenuating and cushioning properties of pads for use in sport applications, the array of elastomeric cylinders would be graduated in height to fit the contours of the surface layer 110.

In the example of a rifle butt pad as indicated in FIG. 5, the series of frustoconical shaped cylinders are advantageously graduated in height from one end of the pad to the other. If a line is drawn across the column ends 127, this graduation in height will maintain a constant thickness of surface layer t while following the contours required of the structure. In this embodiment, the circumferences of the opening 108 of the cylinders remain constant. At a virtual circumference 107 within the shaft of column 120 (illustrated by the multiple dotted lines 107), the inner walls of the cylinder cease to be linear and begin to be curved, curving to form dome 128. A cross-sectional slice taken at circumference 107 will become smaller with each incremental increase in height because of the frustoconical shape of the cylinders.

For example, for a nominal contour where the overall height T increases from 1 to 1.3 Inches, and a constant cylinder opening at the end opposite the dome 108 of 0.445 Inch diameter, the series of domed frustoconical cylinders are graduated in height h (measured in inches) according to the following equation, where each cylinder in the series is numbered from 1 to n:

$$h=0.0116n^2-0.0362n+0.50 \text{ [+ or − up to 0.02]}$$

Similarly, the diameter of the circular cross-section of the cylinder taken at the point where the inner walls cease to be linear (illustrated by the multiple dotted lines 107) will become narrower as the height of the cylinder increases and the thickness of the cylinder wall taken at the point where the inner walls cease to be linear (illustrated by the multiple dotted lines 107) will become wider as the height of the cylinder increases.

It will be appreciated that in the case of an array of cylinders, as opposed to a linear series, cylinder heights will have to be adjusted to fit the contours of the surface layer 110 accordingly.

In FIG. 6, a graph of curves of peak impact forces vs drop height is presented. It is different from force vs displacement curves presented in previous disclosures. It is believed that such a graph provides more functionally applicable data concerning the capacity of the structures for absorbing impact shock which is the purpose for which they were designed.

For the data presented in the graph, peak impact forces (Gmax) were measured on three different embodiments using missile E in accordance with ASTM procedure F355-10a. Gmax was plotted as a function of drop height in inches. The curve is from data plotted with a pad embodiment substantially as described herein.

Pads are generally and advantageously made of an SBR/EPDM/natural rubber elastomeric material with the following properties: Shore A Durometer of 40 to 70 (more particularly 40-50 and advantageously about 44) measured on the surface of the mat; modulus of about 0.5 MPa to about 4 MPa, and advantageously at about 0.60 Mpa.

Preferred substructures can be on a uniform grid or in a honey-combed configuration. Preferred substructures can be of circular, elliptical, or multi-sided shape from three sided to 20 sided or more. Preferred substructures can have a shared wall configuration without elastomeric bridge linkage between the cylinders on the one hand, or can alternatively be joined to one another by elastomeric linkages.

With regard to systems and components above referred to, but not otherwise specified or described in detail herein, the workings and specifications of such systems and components and the manner in which they may be made or assembled or used, both cooperatively with each other and with the other elements disclosed herein to effect the purposes herein disclosed, are all believed to be well within the knowledge of those skilled in the art. No concerted attempt to repeat here what is generally known to the artisan has therefore been made.

INDUSTRIAL APPLICABILITY

Impact and shock absorbing pads in athletic equipment requiring padding, such as rifle butt pads, helmet pads, shoulder, knee and elbow pads, gloves, and so forth, must prevent impact injury and cushion against repetitive impact stress.

Disclosed pads are tuned to the ideal level of compliance that research shows maximizes impact absorption performance. Optimized performance ensures stability and support while reducing pressure on the particular body part, reducing shock and maximizing fatigue reduction. Conventional compliant materials compact and get hard when they are compressed. The unique structures disclosed herein are actually firm to the touch, but then get softer as applied pressure is increased. Impact and shock absorbing pads are thus adapted for use on or within many types of sports equipment.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A resilient pad system, comprising at least one pad, the pad having surfaces,
    the pad comprising a plurality of supporting resilient substructure hollow columns, wherein each column of the plurality of columns further comprises a column wall surrounding a column central axis and a column central void, and column first and second ends, wherein the second end is enclosed and the void extends from the first end to the second end of the column;
    wherein each column wall of the plurality of columns, respectively, has a cross-sectional thickness that is thinner at the respective column first end than at the enclosed second end;
    wherein each such column wall has, in a region abutting the first column end a more collapsible zone where the column wall cross-section is thinner, relative to a less collapsible zone in a region abutting the second end of the wall where the column wall cross-section is thicker;
    wherein at least one of the pad surfaces is contoured to a non-planar surface;
    wherein the pad system has a cross-sectional pad thickness T that increases continuously from one side of the pad to the other;
    wherein each central void defined by the column walls has a height h at the column central axis within the cross-sectional thickness T, such that h increases continuously from one side of the pad to the other; and
    wherein a pad surface layer with cross-sectional thickness t extends beyond the enclosed end of each central void within the cross-sectional pad thickness T, such that T=t+h.

2. The resilient pad system of claim 1 wherein each respective column wall of the plurality of columns tapers, forming a frustoconically shaped column.

3. The resilient pad system of claim 2 wherein the cross-sectional thickness of each respective column wall increases from the first end of the column to the enclosed end of the column by a percentage within a range of greater than 184% and less than 231%.

4. The resilient pad system of claim 2 wherein each respective column wall increases in thickness to meet and form a dome at the enclosed end of the column.

5. The resilient pad system of claim 1 wherein the ratio of h:t falls within the range of greater than 4 and less than 6.

6. The resilient pad system of claim 1 where n denotes a numbering of the columns ranging from one side of the pad to the other, the central void height h increases from one side of the pad to the other according to the equation:

$$h=0.0116n^2-0.0362n+[0.53+/-0.04].$$

7. The resilient pad system of claim 6 wherein the quantity [0.53+/−0.04] is 0.49, such that the equation reads:

$$h=0.0116n^2-0.0362n+0.49.$$

\* \* \* \* \*